(12) United States Patent
Ko et al.

(10) Patent No.: US 7,688,722 B2
(45) Date of Patent: Mar. 30, 2010

(54) COMMUNICATION APPARATUS, METHOD, AND COMPUTER READABLE MEDIUM THEREOF FOR SWITCHING CHANNELS IN A BEACON NETWORK

(75) Inventors: Li-Chun Ko, Taipei (TW); Chi-Wen Teng, Sanchong (TW); Yung-Chih Liu, Taipei (TW); Yu-Chee Tseng, Hsinchu (TW)

(73) Assignee: Institute for Information Industry, Taipei (TW)

( * ) Notice: Subject to any disclaimer, the term of this patent is extended or adjusted under 35 U.S.C. 154(b) by 471 days.

(21) Appl. No.: 11/677,942

(22) Filed: Feb. 22, 2007

(65) Prior Publication Data
US 2008/0123680 A1 May 29, 2008

(30) Foreign Application Priority Data
Nov. 28, 2006 (TW) .............................. 95143982 A

(51) Int. Cl.
*H04W 4/00* (2009.01)
*H04J 3/00* (2006.01)
(52) U.S. Cl. ..................... 370/229; 370/329; 370/341
(58) Field of Classification Search ................. None
See application file for complete search history.

(56) References Cited
U.S. PATENT DOCUMENTS

| 6,751,248 | B1 | 6/2004 | Tan |
| 7,403,746 | B2* | 7/2008 | Molisch ................ 455/67.11 |
| 7,450,627 | B2* | 11/2008 | Couch et al. ............. 375/132 |
| 7,508,811 | B2* | 3/2009 | Shao et al. ............... 370/347 |
| 2004/0184473 | A1 | 9/2004 | Tavli et al. |
| 2004/0255001 | A1* | 12/2004 | Oh et al. .................. 709/209 |
| 2005/0090264 | A1* | 4/2005 | Kim ......................... 455/455 |
| 2005/0135379 | A1* | 6/2005 | Callaway et al. ....... 370/395.31 |
| 2005/0163144 | A1 | 7/2005 | Srikrishna et al. |
| 2005/0171662 | A1* | 8/2005 | Strege et al. ............... 701/33 |
| 2007/0110001 | A1* | 5/2007 | Ting et al. ................ 370/332 |

* cited by examiner

*Primary Examiner*—Chi H Pham
*Assistant Examiner*—Soon-Dong D Hyun
(74) *Attorney, Agent, or Firm*—Patterson, Thuente, Skaar & Christensen, P.A.

(57) ABSTRACT

A communication apparatus originally transmits data packets via a first channel based on a first beacon interval. A memory thereof records the first beacon interval. A receiving interface thereof receives information of a second channel. A processor thereof determines whether the second channel has been used according to the information. If not, a transmission interface thereof switches the communication channel to the second channel, and transmits data based on the first beacon interval via the second channel in order to solve the problem that packets are delay for transmission or even abandoned due to overload of the beacon network.

15 Claims, 7 Drawing Sheets

COMMUNICATION APPARATUS, METHOD, AND COMPUTER READABLE MEDIUM THEREOF FOR SWITCHING CHANNELS IN A BEACON NETWORK

This application claims the benefit of priority based on Taiwan Patent Application No. 095143982 filed on Nov. 28, 2006 of which the contents are incorporated herein by reference in its entirety.

CROSS-REFERENCES TO RELATED APPLICATIONS

Not applicable.

BACKGROUND OF THE INVENTION

1. Field of the Invention

The present invention relates to a communication apparatus and a method for switching channels in a beacon network; more specifically, relates to a communication apparatus and a method for transmitting data through different channels of the same beacon interval (BI). The method can be implemented by a computer program which is stored in a computer readable medium.

2. Descriptions of the Related Art

Multi-node wireless networks operating in a beacon mode adopt an operating manner similar to a time division multiple access (TDMA) to assign transmission time to different nodes. The wireless standard of IEEE 802.15.4 is one of the multi-node wireless networks. The standard of IEEE 802.15.4 is designed to satisfy wireless network requirements of supporting low data rate, low power consumption, and low cost in the market. The ZigBee Alliance established in 2002 has defined ZigBee wireless communication standard based on IEEE 802.15.4 wireless standard. ZigBee wireless communication standard has advantages of simple structure, low cost, and easy implement.

Architecture of a general beacon network is shown in FIG. 1. The beacon network comprises a gateway 101, a router 103, and a plurality of terminals 105, 107. The gateway 101 is capable of building up a beacon network, and communicates with the router 103 and the terminals 105 wirelessly. Each terminal 107 communicates with the router 103 wirelessly as well. The terminals 105, 107 comprise a transmission interface and a receiving interface, respectively. The transmission interface is configured to transmit data, i.e., to transmit data to the gateway 101 or the router 103 after the data is converted into packets. The receiving interface is configured to receive data, i.e., to receive packets from the gateway 101 or the router 103. The router 103 can relay packets to the gateway 101 or other routers. And the terminals 105, 107 do not have the capability to relay other packets.

The gateway 101 and the router 103 transmit a beacon in a fixed beacon interval. The beacon carries information of the beacon interval so that the gateway 101, the router 103, and the terminals 105, 107 can use the same beacon interval in the same channel. A time period is divided into several transmission units, such as time slots, that make the gateway 101, the router 103, and the terminals 105, 107 able to arrange the timing to transmit data packets based on the beacon interval.

In the beacon network, one channel is divided into a plurality of beacon intervals. One beacon interval is used to transmit data of all nodes in the beacon network. One beacon interval 201 of one channel is shown in FIG. 2. The beacon interval 201 can be divided into a time slot 203 for transmitting data among the gateway 101, the router 103, and the terminals 105, a time slot 205 for transmitting data between the router 207 and the terminals 107, and other unused time slots 207. The time slot 203 is further divided into a plurality of sub-time slots 2031. Each sub-time slot 2031 is assigned to one of the router 103 and the terminals 105 to transmit data. Similarly, the time slot 205 is divided into a plurality of sub-time slots 2051. Each sub-time slot 2051 is assigned to one of the terminals 107 to transmit data.

Since the IEEE 802.15.4 wireless network operating in the beacon mode uses one channel to transmit data, jamming of data packets is usually happened in the above multi-node beacon networks. And because of the limitation of physical bandwidth of the beacon network, once data is too large to be loaded on the physical network, the gateway 101 and the router 203 are forced to delay transmissions of packets or to drop packets. In addition, when the number of routers or terminals in the same beacon network increases, a transmission bandwidth of the routers and terminals will decrease so that it will take more time to transmit packets with the same size. Consequently, how to enhance the data transmission capacity and enhance data transmission speed without changing existing architecture of the beacon network is a problem required to be solved.

SUMMARY OF THE INVENTION

One objective of this invention is to provide a method for switching channels in a beacon network, wherein the beacon network comprises a communication apparatus. The communication apparatus uses a first channel to transmit data based on a first beacon interval initially. The method comprises the following steps: recording the first beacon interval; receiving information of a second channel; determining whether the second channel has been used according to the information; and switching to the second channel to transmit the data based on the first beacon interval through the second channel if the second channel is determined not used.

Another objective of this invention is to provide a communication apparatus capable of switching channels to transmit data. The communication apparatus uses a first channel to transmit the data based on a first beacon interval in a beacon network initially. The communication apparatus comprises a memory, a receiving interface, a processor, and a transmission interface. The memory records the first beacon interval. The receiving interface receives information of a second channel. The processor determines whether the second channel has been used according to the information. The transmission interface is switched to the second channel to transmit the data based on the first beacon interval through the second channel if the second channel is determined not used.

Yet a further objective of this invention is to provide a computer readable medium storing a computer program for a communication apparatus to execute a method for switching channels in a beacon network. The communication apparatus uses a first channel to transmit data based on a first beacon interval initially. The method comprises the following steps: recording the first beacon interval; receiving information of a second channel; determining whether the second channel has been used according to the information; and switching to the second channel to transmit the data based on the first beacon interval through the second channel if the second channel is determined not used.

The above communication apparatus can be a gateway and a router for relaying data packets, or a terminal which is incapable of relaying other packets. In addition to the channel originally used, this invention can choose other channels to transmit data with the same beacon interval to avoid errors during transmission. Accordingly, the objective of enhancing the data transmission capacity and data transmission speed without changing existing wireless network architecture will be achieved.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
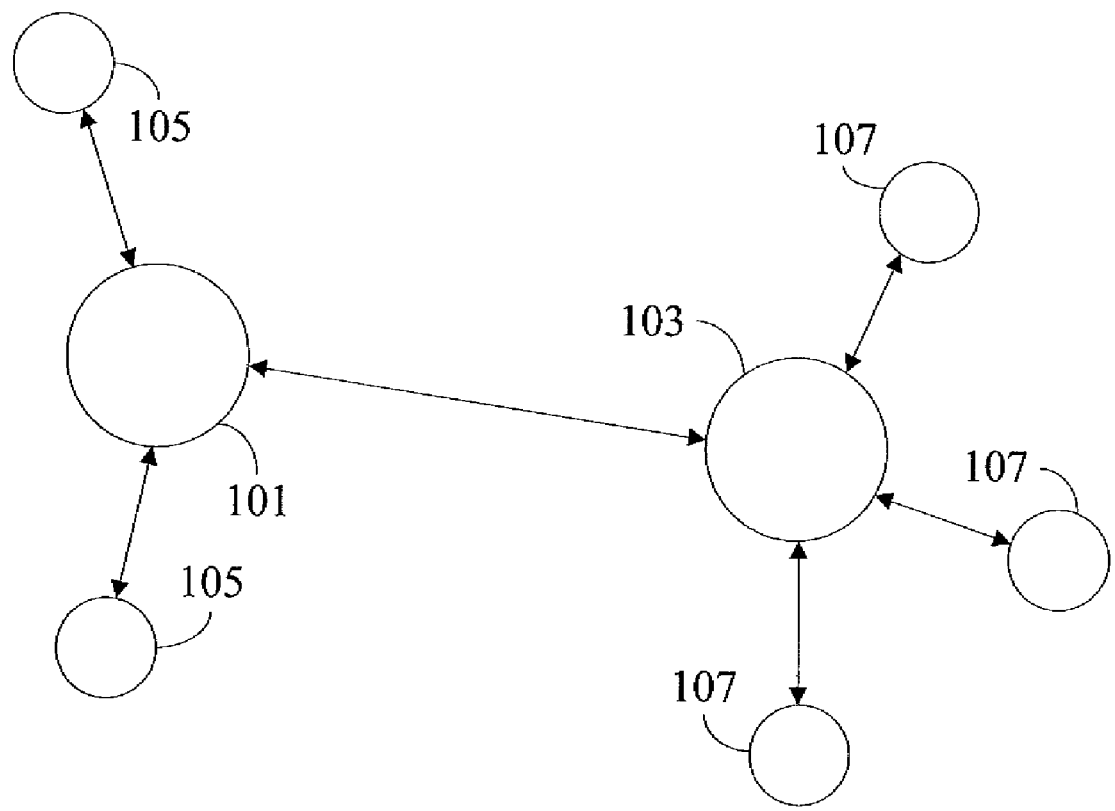
FIG. 1 is a schematic diagram illustrating a beacon network under IEEE 802.15.4 standard of the prior art.
Figure 2:
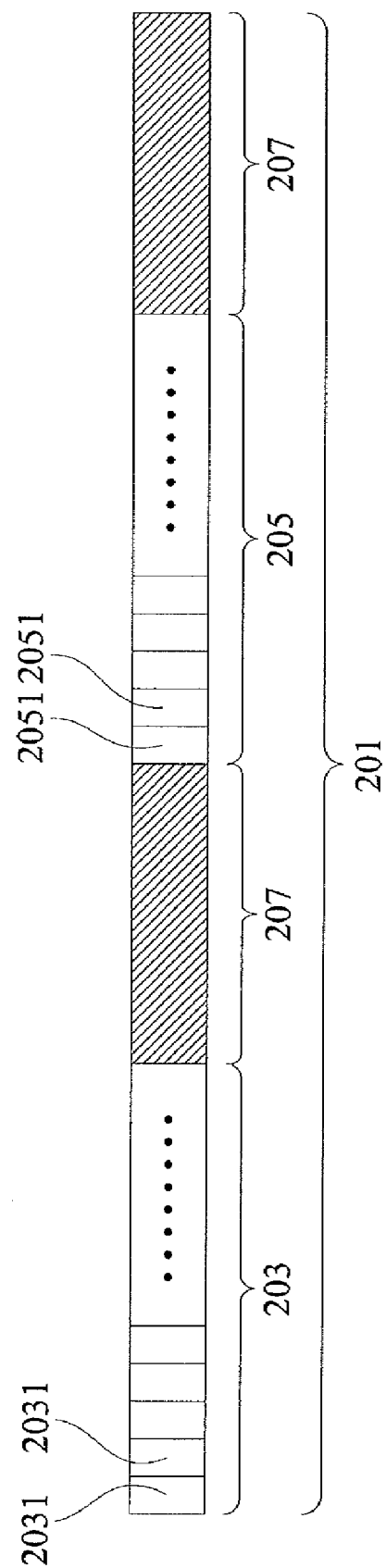
FIG. 2 is a schematic diagram illustrating a beacon interval of one channel of the beacon network of the prior art.
Figure 3:
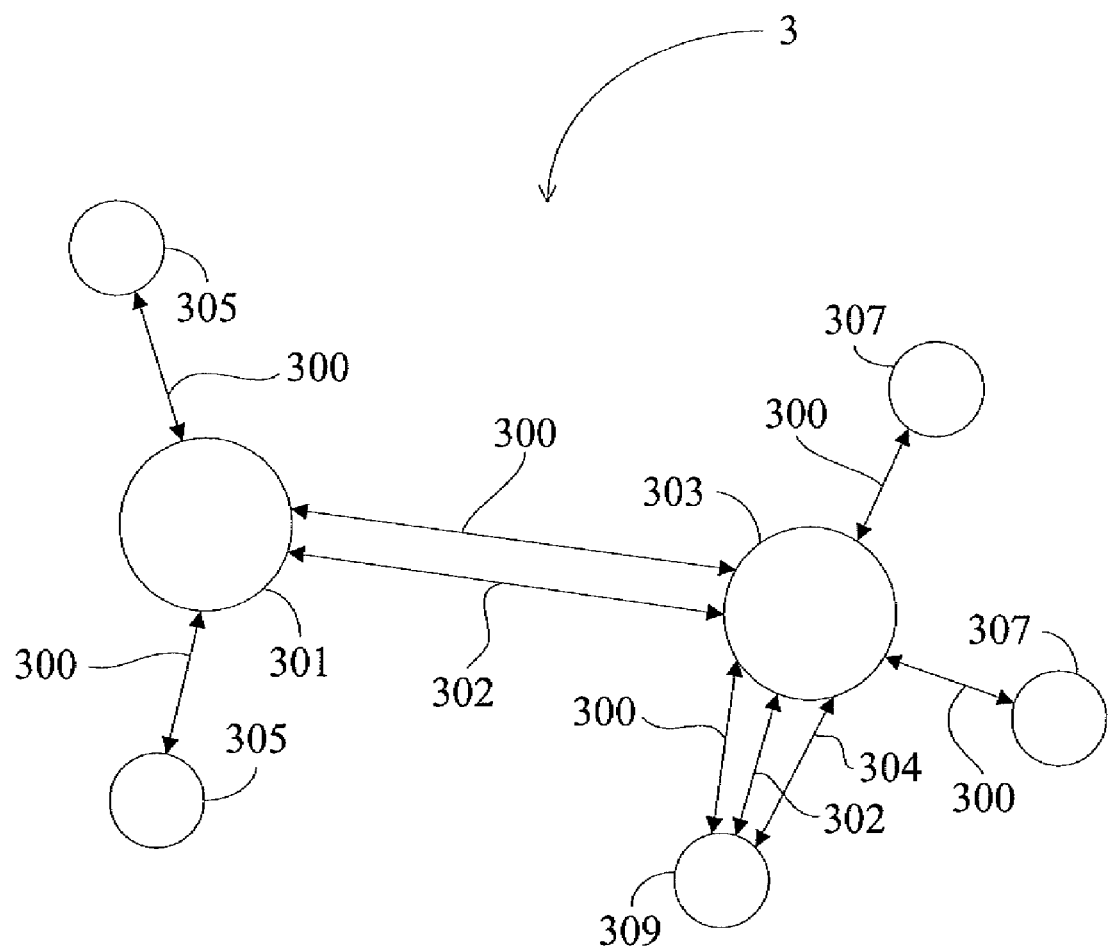
FIG. 3 is a schematic diagram illustrating a beacon network of a first embodiment of the present invention.

As shown in FIG. 3, a first embodiment of this invention is a beacon network 3 under IEEE 802.15.4 standard. The beacon network 3 comprises a plurality of nodes, such as a gateway 301, a communication apparatus 303, and a plurality of terminals 305, 307. The gateway 301 is configured to establish the beacon network 3, and communicate with the communication apparatus 303 and the terminals 305 through a first beacon interval based on a first channel 300. The communication apparatus 303 communicate with the terminals 307 through the first beacon interval based on the first channel 300 as well. Although the communication apparatus 303 of the first embodiment is a router, the present invention does not limit to this. For example, the communication apparatus 303 can be a gateway or a terminal capable of transmitting data in the beacon mode.

Figure 4:
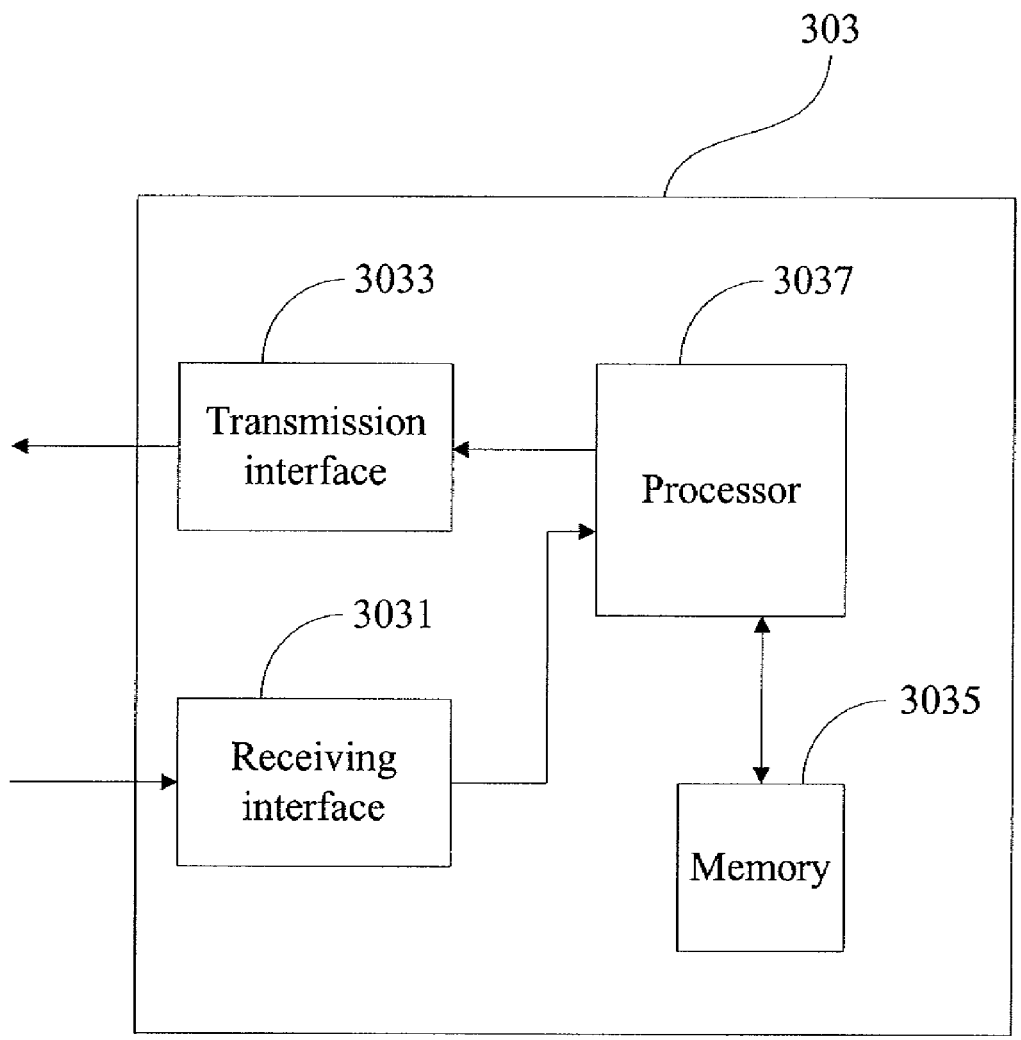
FIG. 4 is a schematic diagram illustrating a communication apparatus of the first embodiment of the present invention.

As shown in FIG. 4, the communication apparatus 303 comprises a receiving interface 3031, a transmission interface 3033, a memory 3035, and a processor 3037, wherein the receiving interface 3031 and the transmission interface 3033 are the communication interfaces of the communication apparatus 303. The memory 3035 can be any memory unit, such as a built-in memory of the communication apparatus 303 or a memory card compatible to the communication apparatus 303. The processor 3037 can be a microcontroller of the communication apparatus 303. All the components are the essential components of existing communication apparatuses that are well known to people skilled in the art and thus no unnecessary detail for the architecture is given here.

When a node 309 intends to join the beacon network 3 established by the gateway 301 via the communication apparatus 303, the node 309 uses the first channel 300 to transmit data to the communication apparatus 303 based on the first beacon interval initially. More specifically, after the node joins the beacon network 3, the communication apparatus 303 receives information comprising the first beacon interval from the gateway 301. After the receiving interface 3031 receives the information, the information is transmitted to the processor 3037. Then the processor 3037 stores the information comprising the first beacon interval into the memory 3035.

If the first channel 300 becomes jamming because the node 309 joins the beacon network 3, the processor 3037 switches the receiving interface 3031 to a second channel 302 and receives information of the second channel 302. The processor 3037 determines whether the second channel 302 is used by other nodes according to the information of the second channel 302 received by the receiving interface 3031. That is, the processor 3037 determines whether packets of other nodes have been transmitted in the second channel 302. If yes, that means the second channel 302 has been used. If no, the processor 3037 controls the transmission interface 3033 to switch to the second channel 302 so that the transmission interface 3033 periodically transmits a beacon to the beacon network 3 through the second channel 302. The node 309 hence receives the beacon. Then, the communication apparatus 303 uses the second channel 302 to perform data transmission with the node 309, while the communication apparatus 303 still uses the first channel 300 to perform data transmission with other nodes that exist originally.

In other words, when the first channel 300 fails to provide required bandwidth for transmitting data between the communication apparatus 303 and the node 309, the communication apparatus 303 switches to the second channel 302 to communicate with the node 309 to assure continuous data transmission and to avoid the data communication being interrupted or delayed.

Figure 5:
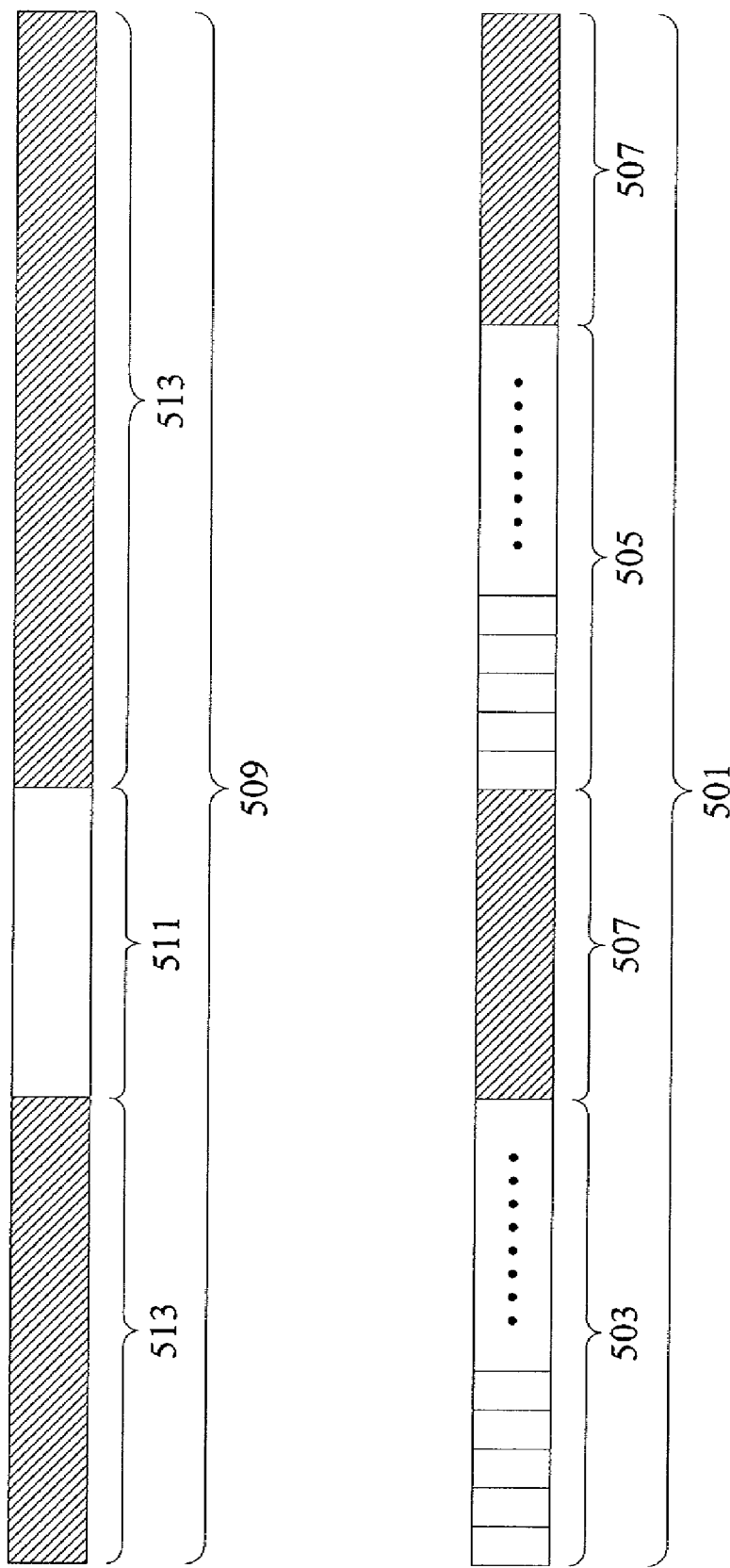
FIG. 5 is a schematic diagram illustrating beacon intervals of channels of the first embodiment of the present invention.

The beacon intervals used in the above first channel 300 and the second channel 302 are shown in FIG. 5. The numeral reference 501 denotes a beacon interval of the first channel 300. The numeral reference 509 denotes a beacon interval of the second channel 302. Both beacon intervals have the same length. The beacon interval 501 is divided into time slots 503, 505, 507, wherein the time slot 503 is used to transmit data among the gateway 301, the communication apparatus 303, and the terminals 305, the time slot 505 is used to transmit data between the communication apparatus 303 and the terminals 307, and the time slot 507 is an inactive region. The beacon interval 509 is divided into time slots 511, 513, wherein the time slot 511 is used to transmit data between the communication apparatus 303 and the node 309, and the time slot 513 is an inactive region. According to the above descriptions, the node 309 newly added to the beacon network 3 uses the second channel 302 to perform communication without occupying the bandwidth of the first channel 300. Therefore, a jamming situation of the bandwidth will not occur.

When the processor 3037 determines that the second channel 302 is used by other nodes according to the information of the second channel 302 received by the receiving interface 3031, the processor 3037 further determines whether the second beacon interval of the second channel 302 is the same as the first beacon interval. If the second interval is the same as the first beacon interval, then the processor 3037 controls the transmission interface 3033 to stop transmitting the beacon, and utilizes unused time slots of the second channel 302 directly to transmit data to the node 309 based on the second beacon interval (i.e., the first beacon interval).

In other embodiments, when the second channel interval is the same as the first beacon interval, the processor 3037 still can control the transmission interface 3033 to periodically transmit the beacon to the beacon network 3. Then, the second channel 302 is used to transmit data to the node 309 based on the second interval. Similarly, the communication apparatus 303 can also select the first channel 300 or the second channel 302 to transmit data to the node 309. That is, when the first channel 300 fails to provide the required bandwidth for transmitting data between the communication apparatus 303 and the node 309, the communication apparatus 303 still can be switched to the second channel 302 to transmit data to the node 309.

Figure 6:
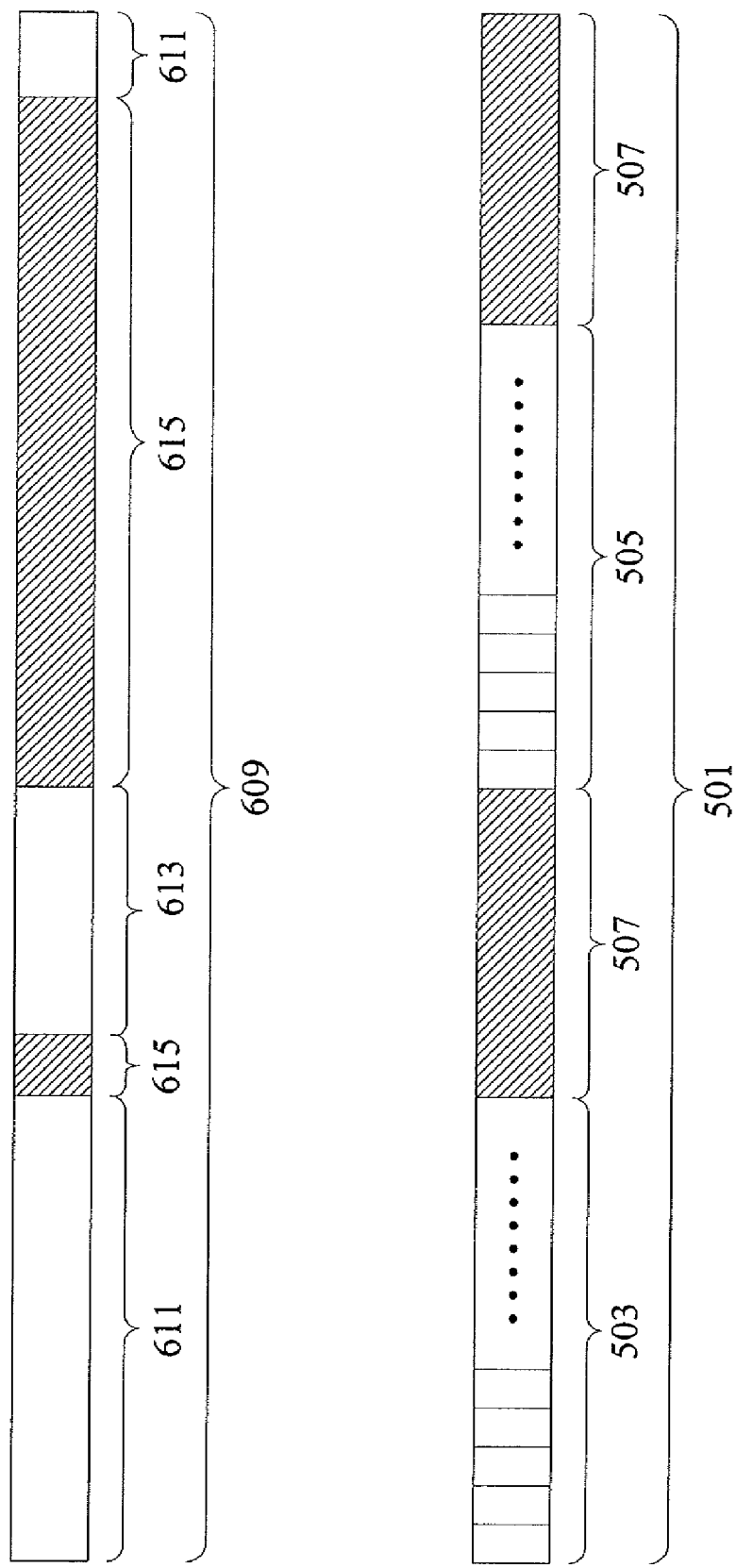
FIG. 6 is another schematic diagram illustrating beacon intervals of channels of the first embodiment of the present invention.

Under such a condition, an example of the beacon intervals of the first channel 300 and the second channel 302 is shown in FIG. 6. The numeral reference 609 denotes a beacon interval of the second channel 302. The beacon interval 501 of the first channel 300 has described above and thus not repeated here. Both beacon intervals have the same length. The beacon interval 609 of the second channel 302 is divided into time slots 611, 613, 615. The time slot 611 is used for other nodes which have already transmitted data through the second channel 302. The time slot 613 is used for the communication apparatus 303 and the node 309 to transmit data. The time slot 615 is an inactive region.

If the processor 3037 determines that the second channel 302 has been used by other nodes, and the second beacon interval is different from the first beacon interval, that means the second channel 302 is used by other networks. The processor 3037 then controls the transmission interface 3033 to switch to a third channel 304 and repeats above operations to find out any available channel other than the first channel 300 and the second channel 302. After the available channel is found, the processor 3037 controls the transmission interface 3037 to periodically transmit a beacon to the beacon network 3 based on the available channel. The beacon carries information of the first beacon interval. And the node 309 communicates with the communication apparatus 300 via the available channel according to the information of the first beacon interval.

When the communication apparatus 303 periodically transmits a beacon to the beacon network 3 via the available channel, e.g., the third channel 304, another beacon is still periodically transmitted to the beacon network 3 via the first channel 300 so that the communication apparatus 303 can choose either the first channel 300 or the third channel 304 to transmit data to the node 309. Therefore, if the first channel 300 is unable to provide the required bandwidth for transmitting data between the communication apparatus 303 and the node 309, the communication apparatus 303 can switch to the third channel 304.

In other words, the transmission interface 3037 is switched to the third channel 304 and transmits data via the third channel 304 based on the first beacon interval. The transmission interface 3037 transmits data to the node 309 via the third channel 304. A beacon network usually has sixteen channels for use in IEEE 802.15.4 standard. When the communication apparatus 303 has tried all channels, and there is no channel available, the first channel 300 is used for transmitting data.

The above communication apparatus 303 not only starts to establish other channels after the node 309 joins the beacon network 3, but also obtains the first beacon interval of the first channel 300 of the gateway 301 through a beacon received by the receiving interface 3031 before the node 309 joins to the beacon network 3. In this way, each component in the communication apparatus 303 can perform the above operations in advance to establish the second channel 302, the third channel 304, or other channels so that the normal operations will not be influenced by the operations of scanning channels after the node 309 joins to the beacon network 3.

According, when the communication apparatus 303 periodically transmits a beacon to the beacon network 3 via the second channel 302, another beacon is periodically transmitted to the beacon network 3 via the first channel 300 as well.

The beacon transmitted by the communication apparatus 303 via the first channel 300 records that the communication apparatus 303 can transmit data via the second channel 302. Therefore, after the node 309 joins the beacon network 3, the node 309 not only receives the beacon via the second channel 302, but also receives the beacon via the first channel 300. More specifically, since the node 309 simultaneously receives the beacons from the first channel 300 and the second channel 302, the node 309 can transmit data via either the first channel 300 or the second channel 302 to guarantee that the node 309 can transmit data correctly and timely.

The communication apparatus 303 of the present invention is not limited to periodically transmit a beacon to the beacon network 3 via the second channel 302. When the communication apparatus 303 periodically transmits a beacon to the beacon network 3 via the third channel 304, a beacon is also periodically transmitted via the first channel 300 to the beacon network 3. According to the above descriptions, those skilled in the art straightforwardly realize the corresponding operations of the communication apparatus 303, and thus no necessary detail is given here.

Figure 7:
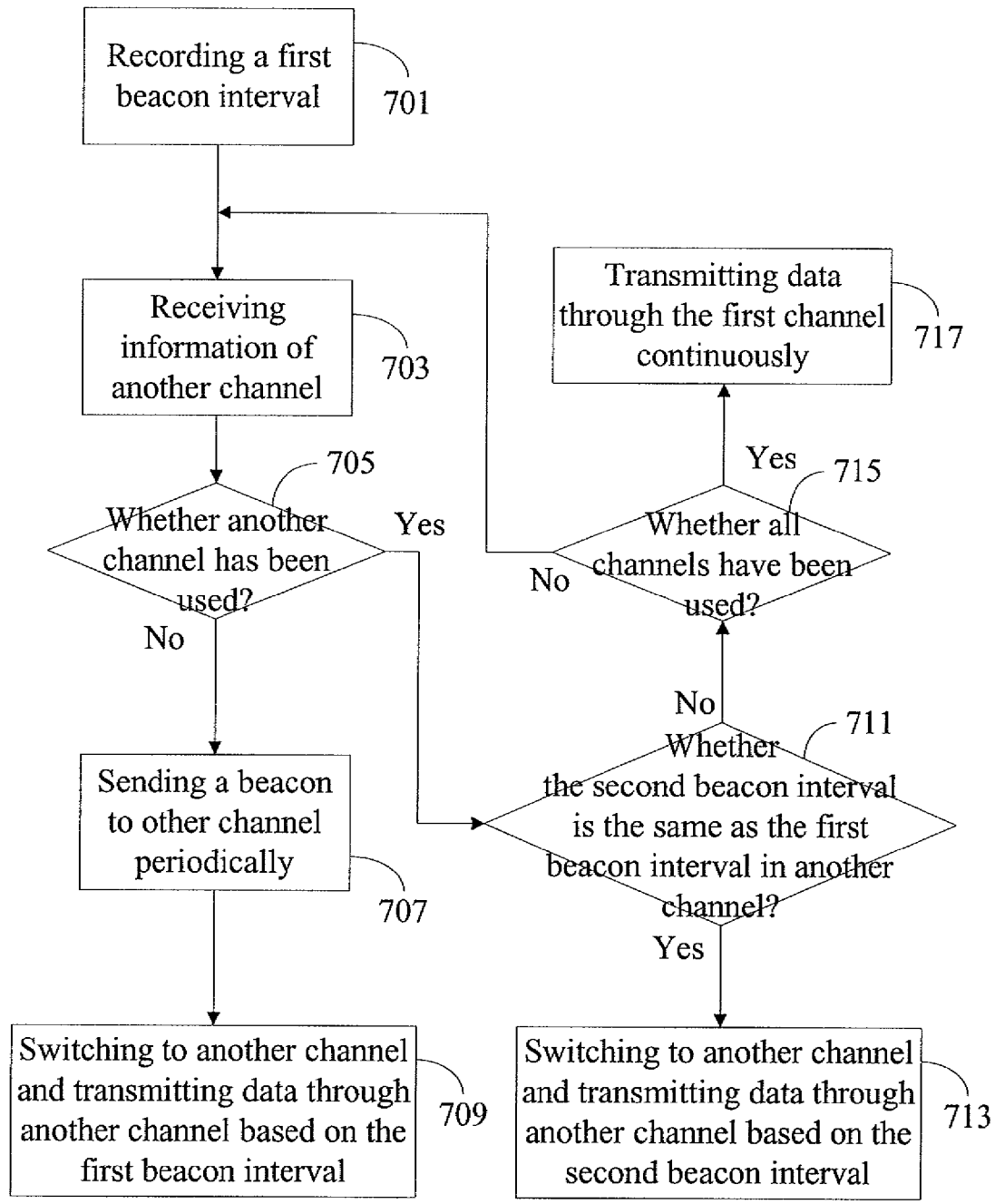
FIG. 7 is a flow chart of a second embodiment and a third embodiment of the present invention.

A second embodiment of the present invention is a method for switching channels in the beacon network 3. The method is applied to the communication apparatus 303 as described in the first embodiment. As shown in FIG. 7, the method of the second embodiment is performed by a computer program which is stored in a non-transitory computer readable medium.

If the first channel 300 becomes jamming because the node 309 joins the beacon network 3, step 701 is executed in which the computer program comprises code for the processor 3037 storing information comprising the first beacon interval into the memory 3035 to record the first beacon interval. Next, step 703 is executed in which the computer program comprises code for the processor 3037 controlling the receiving interface 3031 to receive information of another channel, such as the second channel 302. Then, step 705 is executed in which the computer program comprises code for the processor 3037 determining whether packets of other nodes have been transmitted in the said another channel. If no, step 707 is executed in which the computer program comprises code for the processor 3037 controlling the transmission interface 3033 to periodically transmit a beacon to the beacon network 3 via the said another channels, wherein the beacon carries information of the first beacon interval. Next, step 709 is executed in which the computer program comprises code for the processor 3037 controlling the transmission interface 3033 to switch to the said another channel to transmit data to the node 309 via the said another channel based on the first beacon interval. The communication apparatus 303 and other nodes that exist originally still transmit data to each other via the first channel 300.

If the said another channel is used by other nodes in step 705, step 711 is executed in which the computer program comprises code for the processor 3037 determining whether a second beacon interval of the said another channel is the same as the first beacon interval. If the second beacon interval is the same as the first beacon interval, step 713 is executed in which the computer program comprises code for the processor 3037 controlling the transmission interface 3033 to stop transmitting the beacon, and utilizes unused time slots of the said another channel to transmit data to the node 309 based on the second beacon interval (i.e., the first beacon interval).

In other embodiments, when the second beacon interval is the same as the first beacon interval, step 713 is executed in which the computer program comprises code for the processor 3037 controlling the transmission interface 3033 to periodically transmit a beacon to the beacon network 3, and the second channel 302 is used transmit data to the node 309 based on the second beacon interval. Similarly, the communication apparatus 303 can also choose the first channel 300 or the second channel 302 to transmit data to the node 309. That is, if the first channel 300 fails to provide the required bandwidth for transmitting data between the communication apparatus 303 and the node 309, the communication apparatus 303 still can transmit data to the node 309 via the second channel 302.

If the second interval of the said another channel is determined different from the first beacon interval in step 711, step 715 is executed in which the computer program comprises code for the processor 3037 determining whether all channels are used. When all of the channels are used, step 717 is executed in which the computer program comprises code for the communication apparatus 303 continuing to transmit data to the node 309 via the first channel based on the first beacon interval. If there are some channels available, the computer program goes back to step 703 for the processor 3037 controlling the receiving interface 3031 to receive information of another channel (such as the third channel 304), and the computer program comprises code for repeating above steps to find out available channels other than the first channel.

In addition to the steps as shown in FIG. 7, the computer program of the second embodiment has code able to execute all of the operations or functions recited in the first embodiment. Those skilled in the art can straightforwardly realize how the second embodiment performs these operations and functions based on the above descriptions of the first embodiment, and thus no unnecessary detail is given here.

A third embodiment of the present invention is another method for switching channels in the beacon network. This method is applied to the communication apparatus 1 described in the first embodiment. For a more detailed description, the method of the third embodiment is the same as the method of the second embodiment. And a flow chart of the method of the third embodiment is shown in FIG. 7 similarly.

If the first channel 300 becomes jamming because a new node joins the beacon network 3, step 701 is executed for storing information of the first beacon interval, that means for recording the first beacon interval. Later, step 703 is executed for receiving information of another channel (such as the second channel 302). Next, step 705 is executed for determining whether packets of other nodes have been transmitted in the said another channel. If no, step 707 is executed for periodically transmitting a beacon to the beacon network 3, wherein the beacon carries information of the first beacon interval. Next, step 709 is executed for switching to the said another channel and using the said another channel to transmit data based on the first beacon interval. Other nodes that exist originally still transmit data via the first channel 300.

If the said another channel is used by a node in step 705, step 711 is executed for determining whether a second beacon interval of the said another channel is the same as the first beacon interval. If the second beacon interval is same as the first beacon interval, step 713 is executed for stopping transmitting the beacon, and other unused time slots of the said another channel are used for transmitting data directly based on the second beacon interval (i.e., the first beacon interval).

In other embodiments, when the second beacon interval is the same as the first beacon interval, step 713 is executed for periodically transmitting a beacon to the beacon network 3, and then transmitting data via the second channel 302 based on the second beacon interval. Similarly, the first channel 300 or the second channel 302 can be chosen to transmit data. That is, when the first channel 300 can not provide the required bandwidth for transmitting data, the second channel 302 can be used for transmitting data instead.

If the second interval of the said another channel is determined different from the first beacon interval in step 711, step 715 is executed for determining whether all channels have been used. When all of the channels are used, step 717 is executed for continuously transmitting data via the first channel based on the first beacon interval. If there is another channel available, the method goes back to step 703 for receiving information of another channel (such as the third channel 304), and repeating above steps to find out available channels other than the first channel.

In addition to the steps as shown in FIG. 7, the method of the third embodiment is able to execute all of the operations or functions recited in the first embodiment. Those skilled in the art can straightforwardly realize how the third embodiment performs these operations and functions based on the above descriptions of the first embodiment, and thus no unnecessary detail is given here.

The computer program may be stored in a computer readable medium. The computer readable medium can be a floppy, a hard disk, an optical disc, a flash disk, a tape, a database accessible from a network, or a storage medium with the same functionality that can be easily thought by people skilled in the art.

According, besides the original channel for transmitting data, the present invention can find out other available channels and use the same beacon interval to transmit data in an unused channel. The present invention can further determine whether the beacon interval among the already used channels is the same as the beacon interval of the original channel for transmitting data. If yes, unused time slots of unused channels are used for transmitting data to achieve an objective of using the bandwidth properly. Therefore, the present invention can appropriately use channels and bandwidth of the beacon network, and enhance the data transmission capacity and the data transmission speed to achieve an objective of not changing existing wireless network architecture operating in the beacon mode.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method applied to a communication apparatus for switching channels in a beacon network, the communication apparatus comprising a memory, a receiving interface, a processor, and a transmission interface, and using a first channel to transmit data based on a first beacon interval initially, the method comprising the steps of:

recording the first beacon interval via the memory;

receiving information of a second channel via the receiving interface;

determining whether the second channel has been used according to the information via the processor; and switching to the second channel to transmit the data via the transmission interface based on the first beacon interval through the second channel if the second channel is determined not used.

2. The method of claim 1, further comprising the steps of:
sending a beacon in the second channel periodically via the transmission interface;
wherein the beacon carries information of the first beacon interval, and the communication apparatus uses the second channel and the beacon network to transmit the data according to the information of the first beacon interval.

3. The method of claim 1, further comprising the steps of:
determining whether a second beacon interval of the second channel is the same as the first beacon interval via the processor if the second channel is determined used by a node, wherein the node uses the second channel to transmit data based on the second beacon interval; and
switching to the second channel to transmit the data via the transmission interface based on the second beacon interval if the second beacon interval is determined the same as the first beacon interval.

4. The method of claim 3, further comprising the steps of:
receiving information of a third channel via the receiving interface if the second beacon interval is determined not the same as the first beacon interval;
determining whether the third channel has been used according to the information of the third channel via the processor; and
switching to the third channel to transmit the data via the transmission interface based on the first beacon interval if the third channel is determined not used.

5. The method of claim 4, further comprising the steps of:
sending a beacon in the third channel periodically via the transmission interface;
wherein the beacon carries information of the first beacon interval, and the communication apparatus uses the third channel and the beacon network to transmit the data according to the information of the first beacon interval.

6. A communication apparatus for switching channels to transmit data, the communication apparatus using a first channel to transmit the data based on a first beacon interval in a beacon network initially, the communication apparatus comprising:
a memory for recording the first beacon interval;
a receiving interface for receiving information of a second channel;
a processor for determining whether the second channel has been used according to the information; and
a transmission interface, being switched to the second channel to transmit the data based on the first beacon interval through the second channel if the second channel is determined not used.

7. The communication apparatus of claim 6, wherein the transmission interface sends a beacon to the beacon network in the second channel periodically, the beacon carries information of the first beacon interval, and the communication apparatus uses the second channel and the beacon network to transmit the data according to the information of the first beacon interval.

8. The communication apparatus of claim 6, wherein the processor further determines whether a second beacon interval of the second channel is the same as the first beacon interval if the processor determines that the second channel is used by a node to transmit data based on the second beacon interval, and the transmission interface is switched to the second channel to transmit the data based on the second beacon interval if the second beacon interval is determined the same as the first beacon interval.

9. The communication apparatus of claim 8, wherein the receiving interface receives information of a third channel if the second beacon interval is determined not the same as the first beacon interval, the processor further determines whether the third channel has been used according to the information of the third channel, and the transmission interface is switched to the third channel to transmit the data based on the first beacon interval if the third channel is determined not used.

10. The communication apparatus of claim 9, wherein the transmission interface sends a beacon to the beacon network in the third channel periodically, the beacon carries information of the first beacon interval, and the communication apparatus uses the third channel and the beacon network to transmit the data according to the information of the first beacon interval.

11. A non-transitory computer readable medium storing a computer program for a communication apparatus to execute a method for switching channels in a beacon network, the communication apparatus using a first channel to transmit data based on a first beacon interval initially, the method comprising the steps of:
recording the first beacon interval;
receiving information of a second channel;
determining whether the second channel has been used according to the information; and
switching to the second channel to transmit the data based on the first beacon interval through the second channel if the second channel is determined not used.

12. The non-transitory computer readable medium of claim 11, wherein the method further comprises the steps of:
sending a beacon in the second channel periodically;
wherein the beacon carries information of the first beacon interval, and the communication apparatus uses the second channel and the beacon network to transmit the data according to the information of the first beacon interval.

13. The non-transitory computer readable medium of claim 11, wherein the method further comprises the steps of:
determining whether a second beacon interval of the second channel is the same as the first beacon interval if the second channel is determined used by a node, wherein the node uses the second channel to transmit data based on the second beacon interval; and
switching to the second channel to transmit the data based on the second beacon interval if the second beacon interval is determined the same as the first beacon interval.

14. The non-transitory computer readable medium of claim 13, wherein the method further comprises the steps of:
receiving information of a third channel if the second beacon interval is determined not the same as the first beacon interval;
determining whether the third channel has been used according to the information of the third channel; and
switching to the third channel to transmit the data based on the first beacon interval if the third channel is determined not used.

15. The non-transitory computer readable medium of claim 14, wherein the method further comprises the steps of:
sending a beacon in the third channel periodically;
wherein the beacon carries information of the first beacon interval, and the communication apparatus uses the third channel and the beacon network to transmit the data according to the information of the first beacon interval.

* * * * *